US010215532B2

(12) United States Patent
Giraud et al.

(10) Patent No.: US 10,215,532 B2
(45) Date of Patent: Feb. 26, 2019

(54) VISUAL DEVICE FOR DESIGNATING OBJECTIVES AND OBJECTIVE-DESIGNATION METHOD USING SAID DEVICE

(71) Applicant: SOFRESUD, La Seyne sur Mer (FR)

(72) Inventors: Marie-Annick Giraud, Sanary sur Mer (FR); Grégory Borg, Toulon (FR); Stéphane Sandoz, La Garde (FR); Bernard Alhadef, Le Castelet (FR)

(73) Assignee: SOFRESUD, La Seyne sur Mer (FR)

(*) Notice: Subject to any disclaimer, the term of this patent is extended or adjusted under 35 U.S.C. 154(b) by 0 days.

(21) Appl. No.: 15/720,213

(22) Filed: Sep. 29, 2017

(65) Prior Publication Data

US 2018/0112951 A1  Apr. 26, 2018

(30) Foreign Application Priority Data

Oct. 14, 2016 (FR) .................................. 16 60002

(51) Int. Cl.

| *F41G 3/02* | (2006.01) |
| *F41G 3/06* | (2006.01) |
| *G01C 19/5776* | (2012.01) |
| *G01C 25/00* | (2006.01) |
| *G01S 17/02* | (2006.01) |
| *G01S 17/08* | (2006.01) |
| *H04N 5/247* | (2006.01) |

(Continued)

(52) U.S. Cl.
CPC .................. *F41G 3/02* (2013.01); *F41G 3/06* (2013.01); *F41G 3/065* (2013.01); *F41G 3/165* (2013.01); *F41G 5/16* (2013.01); *G01C 19/5776* (2013.01); *G01C 25/00* (2013.01); *G01S 17/023* (2013.01); *G01S 17/08* (2013.01); *H04N 5/247* (2013.01); *H04N 5/23248* (2013.01); *H04N 5/23296* (2013.01)

(58) Field of Classification Search
None
See application file for complete search history.

(56) References Cited

U.S. PATENT DOCUMENTS

| 6,202,535 B1* | 3/2001 | Alhadef | .................... F41G 3/02 89/41.09 |
| 2004/0134341 A1* | 7/2004 | Sandoz | .................... F41G 3/02 89/41.09 |

(Continued)

FOREIGN PATENT DOCUMENTS

FR  2758625 A1  7/1998

*Primary Examiner* — Kristy A Haupt
(74) *Attorney, Agent, or Firm* — McCarter & English, LLP (57) ABSTRACT

The invention relates to a device for the designation of objectives, comprising a direct aiming member (D), associated with a gyroscopic unit (G) with three axes not parallel to each other and coupled firstly to
 means for analyzing the signals issuing from the sighting member, said means being able to determine the direction between the sighting member and said objectives and to transmit it to the distant control station provided with action means, and
 secondly to means (2) for recalibrating the gyroscopic unit,
characterized in that it further comprises image-acquisition means (A) providing photography of the objectives, said acquisition means being associated with the direct-sighting member (D) and coupled to software means for processing the images and to means (E) for displaying said images.

19 Claims, 4 Drawing Sheets

(51) Int. Cl.
   *F41G 3/16*      (2006.01)
   *F41G 5/16*      (2006.01)
   *H04N 5/232*     (2006.01)

(56) References Cited

U.S. PATENT DOCUMENTS

| | | | |
|---|---|---|---|
| 2011/0042459 A1* | 2/2011 | Sullivan | F41A 27/14 |
| | | | 235/407 |
| 2012/0214137 A1* | 8/2012 | Goree | F41A 17/063 |
| | | | 434/19 |
| 2014/0110482 A1* | 4/2014 | Bay | F41G 1/38 |
| | | | 235/404 |
| 2016/0084617 A1* | 3/2016 | Lyren | F41G 3/08 |
| | | | 42/135 |

* cited by examiner

VISUAL DEVICE FOR DESIGNATING OBJECTIVES AND OBJECTIVE-DESIGNATION METHOD USING SAID DEVICE

DISCLOSURE OF THE INVENTION

There exist pointing devices for designating objectives intended to supply, to the weapons systems of armed or combat vessels, the angular coordinates in space of air, land or sea targets detected visually by an operator in an observation situation liable to constitute threats.

These devices are traditionally used in the context of observation provided by a sight-defence operator. The operator proceeds with the acquisition of the target by making the objective coincide with a light point or a reticle appearing in the sighting device and designates the target by then pressing on a validation button.

This type of device now constitutes, in the face of an increase in asymmetric threats, an essential self-defence means for military vessels, and as a supplement to the automatic onboard systems functioning by electromagnetic detection (radar) and/or optronic detection (infrared/visible-range turrets).

Such a device, such as the one described in the patent FR 2758625 and referred as EOD (emergency objective designator) or QPD (quick pointing device), comprises sighting means consisting of three FOGs (fibre optics gyrometers) and means for processing the signals issuing from the sighting means. The gyrometers make it possible to identify the three rotation axes passing through the target and to deduce therefrom its direction in a reference frame predefined in space. These data are transmitted to a command and control station (for example the central operations of a combat ship) and enable action means such as a firing station to provide a precise location and following of the target to be monitored and, where applicable, to neutralise it.

In order to compensate for any drift in the gyrometers, the device must be recalibrated on its support at regular intervals (after a few minutes) in order to preserve its precision, which requires interrupting the surveillance.

Furthermore, the operator using this portable device must aim at the target while making it coincide, in the optical sighting means, with a light point. However, because of the instability due to the platform movements, the kinematics of the target and any shaking of the operator, this aiming by focusing often proves to be insufficiently imprecise and/or difficult to execute. This difficulty is increased in the case of poor surface visibility, dazzle, specular reflection or a nocturnal situation since, in such circumstances, the visual acuity of the operator and the precision of the aiming are appreciably reduced.

The known EOD (or QPD) devices provide only the direction of the target, and the distance of the target is then the missing parameter in following the target with precision and successfully undertaking any neutralisation actions.

Moreover, the existing devices, though they offer the possibility of adding additional sighting equipment to the EOD pointing device (such as magnification binoculars or night-vision (thermal) sensors or light-intensification sensors) are not suitable for conjointly receiving a plurality of additional items of equipment. Adding or permutating such equipment, which have their own interface, requires an action of mechanical mounting/demounting that causes degradation of the centring and reduces the precision of the aiming.

Furthermore, EOD devices comprise neither communication means for transmitting information from the command station to the operator nor communication means for sending observations from the latter to the command station.

Finally, the known devices do not comprise means for recording and saving the objective-designation sequences, which deprives the command of feedback and legal evidence.

The invention aims to remedy these technical problems by proposing a device for the acquisition of objectives, comprising a direct aiming member, associated with a gyroscopic unit with three axes not parallel to each other and coupled firstly to means for analysing the signals issuing from the sighting member, said means being able to determine the direction between the sighting member and said objectives and to transmit it to the distant control station provided with action means, and secondly to means for recalibrating the gyroscopic unit, characterised in that it further comprises image-acquisition means providing photography of the objectives, said acquisition means being associated with the direct-sighting member and coupled to software means for processing the images and to means for displaying said images.

According to a preferential embodiment, the device comprises firstly a portable aiming appliance integrating the sighting member, the gyroscopic unit, the means for analysing the signals issuing from the sighting member as well as the image acquisition and display means, and moreover a support box provided with means for recalibrating the aiming appliance.

According to a specific variant, the aiming appliance comprises at least one manoeuvring handle provided with a control member connected to at least one tubular element receiving said image-acquisition means and said image-display means and carrying a removable member for fixing the direct-sighting member.

According to a particular variant, the aiming appliance comprises two substantially parallel manoeuvring grips, inclined upwards and forwards while being connected to two tubular members, respectively upper and lower, with parallel longitudinal axes.

According to another advantageous variant, the recalibration means comprise a box for support and mechanical recalibration of the aiming appliance provided with means for the removable holding of said appliance, an internal computer, and an electronic contact interface providing communication of the appliance with the control station and electrical supply means.

According to an alternative variant, the recalibration means are integrated in the image-processing means.

According to a specific variant, the holding means comprise a set of longitudinal grooves carried by the flanks of the locating appliance and intended to cooperate by sliding with a set of pins, at least partially metallic, carried by the bottom of the box and providing the mechanical interface for contact with said appliance.

Where applicable, the locating appliance is provided with a tie bar.

Preferably, the two grips are inclined relative to the axes of the tubular element.

According to another feature, the locating appliance comprises two control members, consisting respectively of a trigger and a handle.

According to yet another feature, the image-acquisition means comprise at least one video camera.

Preferably, these image-acquisition means comprise at least two video cameras, including a night-vision camera, for example an infrared camera or a light-intensification camera.

At least one of said cameras is equipped with a zoom and an image-stabilisation filter.

Advantageously, the image-acquisition means are associated with means for recording said images with their location and dating.

According to a variant embodiment, the image-display means comprise a video screen mounted in the vicinity of the sighting member.

Provision is advantageously made, according to the invention, for the display means to be able to receive information coming both from the image-acquisition means and from the distant control station.

Advantageously, the device further comprises a microphone and a loudspeaker and a vibrator.

According to yet another variant, the gyroscopic unit comprises MEMS sensors combining the gyrometers with accelerometers.

Advantageously, the sighting member is associated with a laser rangefinder for measuring the distance to the objectives.

Preferably, provision is made for the image-acquisition means to enable fusion thereof on the display means.

Another subject matter of the invention is an objective-designation method, characterised in that the pointing to the target is effected using the device as defined above.

The pointing device of the invention functions on intuitive mode and can therefore be termed an "intuitive pointing device" or IPD.

By exploiting the latest technological advances in image processing, augmented vision, inertial systems based on FOGs (fibre optic gyrometers) and/or MEMSs (micro-electro-mechanical systems), the improvement afforded by the invention to traditional pointing or locating devices makes it possible to improve their operational qualities for emergency objective designation and to be compatible firstly with the latest generation naval combat systems and secondly with future dual systems for civil protection of merchant vessels and offshore platforms.

Further having available pointing and display means integrated in a lightweight, compact and small portable appliance and, secondarily, ergonomic support and recalibration means in the form of a sealed box, the device of the invention is better balanced and allows a more intuitive use by the lookout personnel.

The device of the invention comprises a pointing appliance and a support and mechanical recalibration box. It can be used both in a confined space and outside. In addition to the traditional EOD/QPD functions, which are direct optical vision allowing acquisition of a target and computation of the line of sight from the data of the geometric trihedron (using FOGs or MEMSs) allowing designation thereof, the device of the invention integrates a novel pointing system improving operational use of the emergency objective designation by offering novel functionalities.

The pointing appliance of the device of the invention has ergonomics offering more stable holding in one or two hands (of the light weapon type) than traditional devices. Furthermore, the video photography makes it possible to detect the target in the image close to the reticle and to use it for following the objective in the image. This following mode thus makes it possible to be free from shaking of the operator and differences in sighting.

Furthermore, the objective-acquisition device of the invention makes it possible to know not only the direction but also the distance of the target and thus to undertake neutralisation actions with more precision.

This device also comprises means for transmitting in real time video photographs of the objective and audio sequences to a remote operations centre and offering the possibility of once again recording and viewing this information subsequently and, conversely, the transmission to the operator of assistance information coming from distant stations or sensors with indicators facilitating rallying on the objective without interrupting its pointing.

Finally, the device of the invention offers a plurality of options for correcting drift without requiring carrying out physical recalibration.

BRIEF DESCRIPTION OF THE FIGURES

Other features and advantages of the invention will emerge from a reading of the following description with reference to the accompanying figures detailed below.

For more clarity, identical or similar elements are marked with identical reference signs in all the figures.

DETAILED DESCRIPTION OF EMBODIMENTS

Naturally the embodiments illustrated by the figures presented above and described below are given only by way of non-limitative examples. Provision is explicitly made for it to be possible to combine together these various embodiments in order to propose others.

The device of the invention is intended for the designation of objectives, that is to say, in particular, the acquisition of the position and direction of targets situated in the environment of an operator, with a view to surveillance thereof or possible neutralisation thereof.

Figure 1:
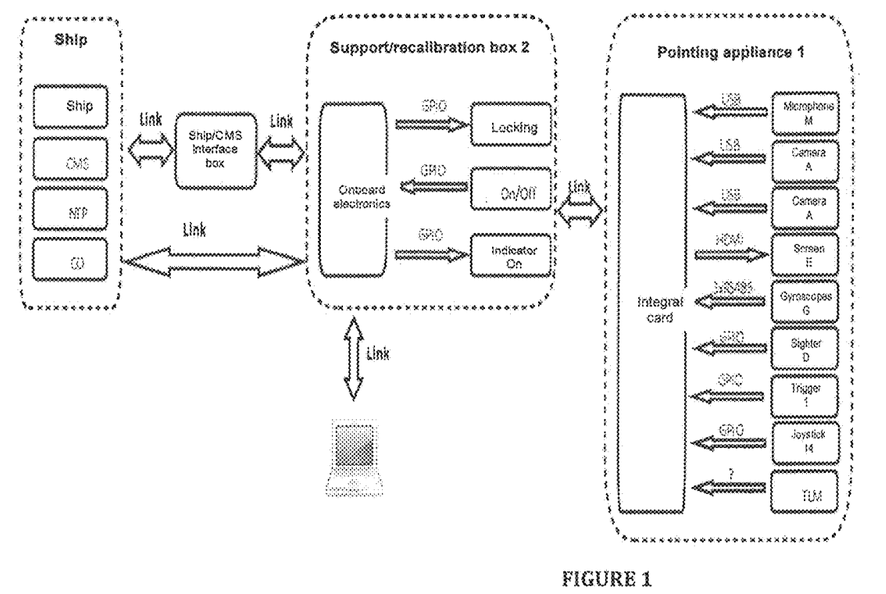
FIG. 1 is a block diagram of hardware means constituting an embodiment of the device of the invention.

Generally and traditionally, and as illustrated by the diagram in FIG. 1, this device comprises a direct sighting member D used by an operator in a lookout situation. This sighting member is associated with a gyroscopic unit G (shown schematically in FIG. 1) or geometric trihedron, with three non-parallel axes preferentially substantially perpendicular to each other and is coupled to means for analysing the signals issuing from the sighting, which are able to determine the direction between the sighting member and the target representing the objective and to transmit it to a distant command and/or control station provided with action means (conduct of firing, etc).

The references mentioned in FIG. 1 correspond to the following elements:
CMS: Combat management system
CO: Control station or central operations
GPIO: General purpose input/output
HDMI: High definition multimedia interface Link: inter-equipment link (Ethernet, Bluetooth, Wi-Fi, serial, etc)

NAV: navigation system of the ship (provides in particular the heading, roll and pitch of the carrier)

NTP: Network time protocol (synchronisation of time-stamped exchanges)

USB: Universal serial bus

Preferably, the gyroscopic unit G comprises a geometric trihedron based on FOG or MEMS sensors optionally combined with accelerometers (inertial sensors), and the sighting member D is, where necessary, associated with a laser rangefinder for measuring the distance to the targeted objective.

According to the invention, the pointing device further comprises image-acquisition means A providing photographs, preferably video, of one or more successive objectives. These video image acquisition means are associated with the direct sighting member D and coupled to software means for processing the images and to means E for displaying these images.

Figure 4A:
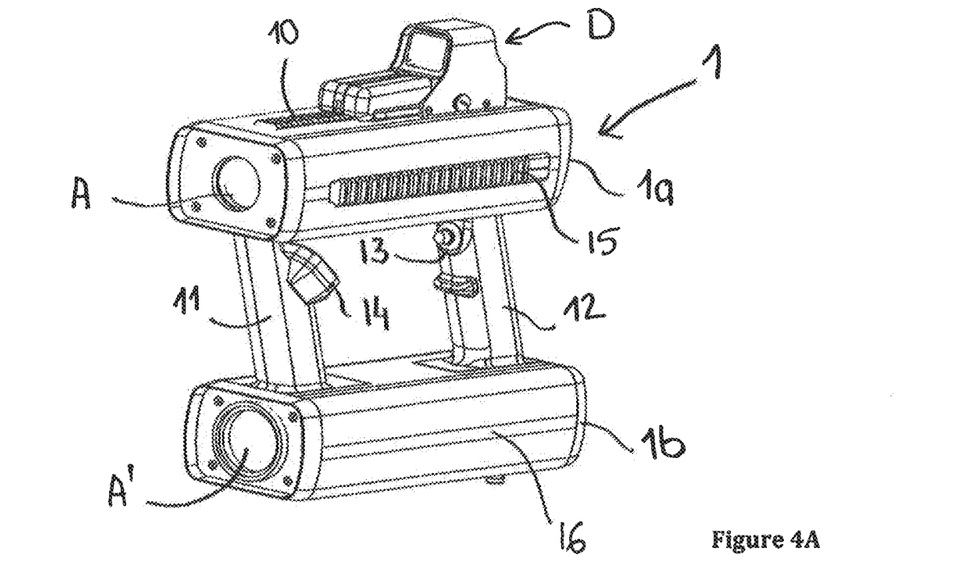
FIGS. 4A and 4B are perspective views of a preferential embodiment of the pointing appliance used in the device of the invention.
Figure 4B:
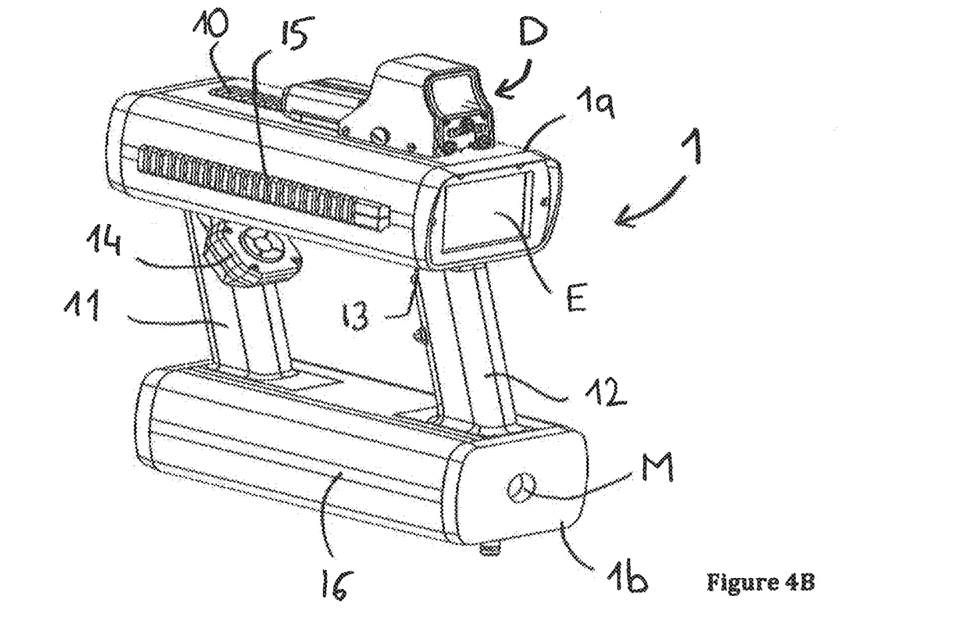

In the embodiment illustrated by FIGS. 4A and 4B, the device of the invention comprises a portable pointing appliance 1 comprising at least one and here two manoeuvring grips 11, 12 provided with at least one control member. The grips 11, 12 provide the connection with at least one tubular element and here a top tubular element 1a and a bottom tubular element 1b oriented along two parallel longitudinal axes. At least one of these two elements and here the top element 1a receives the image-acquisition means A and the means E for displaying these images enabling them to be displayed in real time by the operator.

The top element 1a also carries removable members 10 for fixing the direct sighting member D and additional equipment. These fixing members consist of notched longitudinal grooves 15 forming rails, for example of the "Picatinny" type (MIL-STD 1913 Rail). These rails are provided with electrical connectors allowing the supplementary connection, on the top tubular element 1, of additional electronic equipment (FIGS. 4A, 4B).

In a variant that is not shown, the pointing appliance 1 is provided with a tie bar improving its gripping and stabilisation by bearing on the shoulder of the operator.

The two grips 11, 12 of the pointing appliance are inclined upwards and forwards relative to the axes of the tubular elements, respectively top 1a and bottom 1b, in order to facilitate sighting.

The grips here carry two control members, consisting respectively of a trigger 13 and a short handle 14 of the joystick type.

The image-display means E consist of a video screen mounted in the vicinity of the sighting member D and here at the rear end of the top tubular element 1a.

The pointing appliance further comprises a microphone M and a vibrator and, where necessary, a loudspeaker (not shown) providing the audio connection with other stations and in particular the distant command station.

The image-acquisition means A comprise at least one video camera in the visible range and preferably at least two video cameras A, A', one of which is a night-vision camera (mid-range (3-5 microns) or far (8-12 microns) infrared (IR)), light-intensification camera, wide-band camera in the visible range and the near infrared range (400 to 1100 nanometers). According to the invention, provision is made for at least one of these cameras to be equipped with a zoom and an image-stabilisation filter.

These video image acquisition means (daytime, night time) cooperate with inertial systems based on FOGs (fibre optic gyrometers) and/or MEMSs (micro-electro-mechanical systems) for stabilising the images and working in connection with the means for processing these images, which comprise an integral computer using image-processing algorithms (such as the Open CV library-registered trade mark) and thus leading to a so-called "augmented" vision.

According to a variant, provision is made for the image-processing means to allow the merging of a plurality of images of the same scene in the form of a composite synthesis image viewed on the display means E.

Figure 5A:
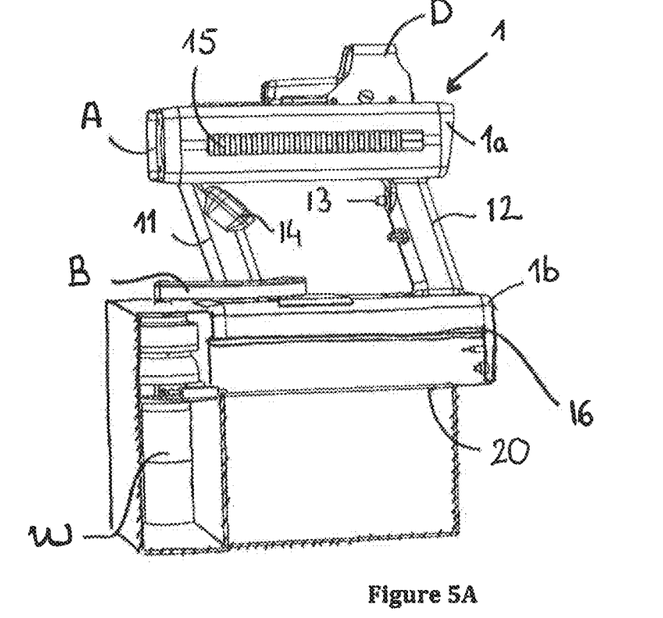
FIGS. 5A and 5B are views, respectively partial exploded profile and in perspective, of a preferential embodiment of the support and recalibration box used in the device of the invention.
Figure 5B:
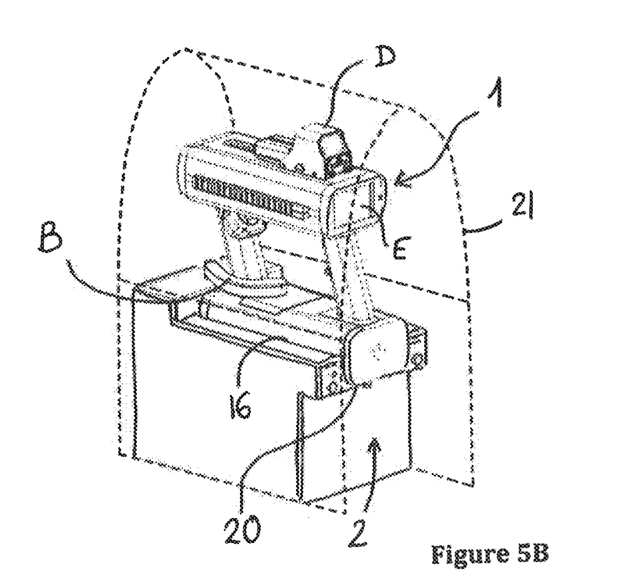

The pointing appliance E and in particular the sighting member D are also coupled to means for recalibrating the gyroscopic unit. These recalibration means may be mechanical and are then housed a box 2, optionally sealed, an embodiment of which is illustrated by FIGS. 5A and 5B.

The box 2 is provided with a cover 21 and is fixed to the deck of the ship or on a fixed base if the appliance is intended for terrestrial application. This box is suitable and intended for providing the temporary support, for the purpose of recalibration, of the pointing appliance 1, being provided, for this purpose, with removable holding means. The box 2 is further equipped with an internal computer, an electronic contact interface providing communication of the pointing appliance 1 with the distant control station, and electrical supply means (not shown).

However, these recalibration means may alternatively be integrated in the image-acquisition means A and the box 2 then merely provides functions of support, recharging the internal battery of the pointing appliance (if the latter is self-contained and without a cable) and sealed storage and/or backup recalibration.

More precisely, gyrometric sensors drift over time and require being recalibrated in a fixed support, thus providing a reference position. According to an embodiment of the invention using mechanical recalibration, this fixed support consists of the box 2. The mechanical recalibration is then provided by the cooperation between firstly two V-shaped female grooves 16 extending parallel and on either side, on the flanks of the bottom tubular element 1b of the pointing apparatus 1, and secondly two male spherical pins (not visible in the figures) carried by the internal walls of the support box 2 and sliding in the grooves 16. A variant, not shown, would consist of replacing one of the grooves with a cylindrical orifice in which one of the pins comes to engage. With a view to providing the electronic contact interface between the box 2 and the pointing appliance 1, the pins are at least partially metallic and are connected to the external recalibration means.

In the recalibration position, the appliance 1 rests in a cradle 20 of the box 2 following the shape of the bottom tubular element 1b (visible in exploded view in FIG. 5A), which comes into forward abutment against a shoulder. The pointing appliance 1 is completely immobilised in a locked position by the action of an arm E pivoting in order to hook onto the grip 11. The arm 3 is rotated by rollers (or a belt) actuated by means of an electric motor unit W (enclosed in the box but visible in FIG. 5A) and is actuated automatically when the pointing appliance 1 is placed in the box 2. Pressing on one of the control members 13 or 14 of the pointing appliance 1 causes automatic unlocking of the arm B and release of the pointing appliance 1.

The detection of the presence of the pointing appliance 1 in the box 2 is achieved by means of a detector situated between the two male pins, this detector optionally being able to be contactless.

In order to improve the ease of use of the device of the invention and to increase its operational availability, provision is made for installing a plurality of fixed support and recalibration boxes, on the inside of the edge and outside.

Figure 2:
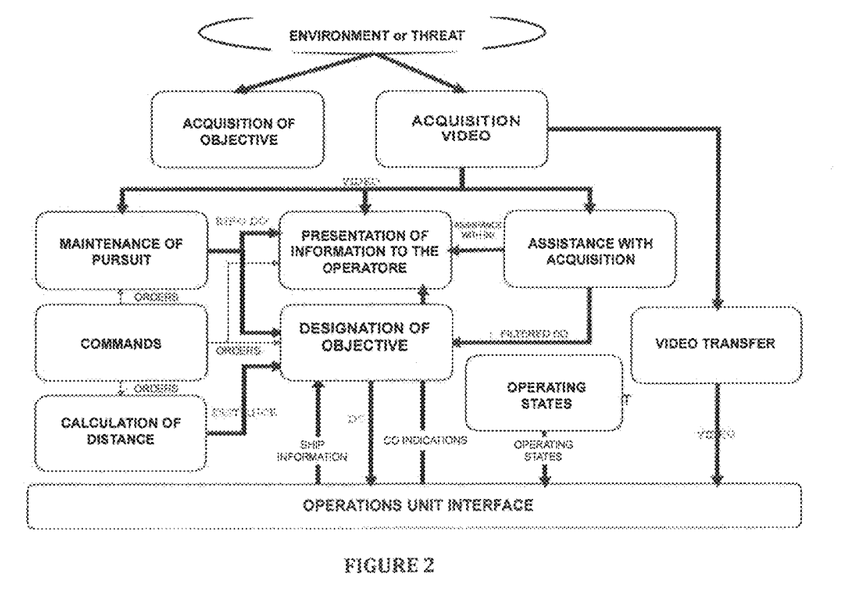
FIG. 2 is a block diagram of functional means of an embodiment of the device of the invention.
Figure 3:
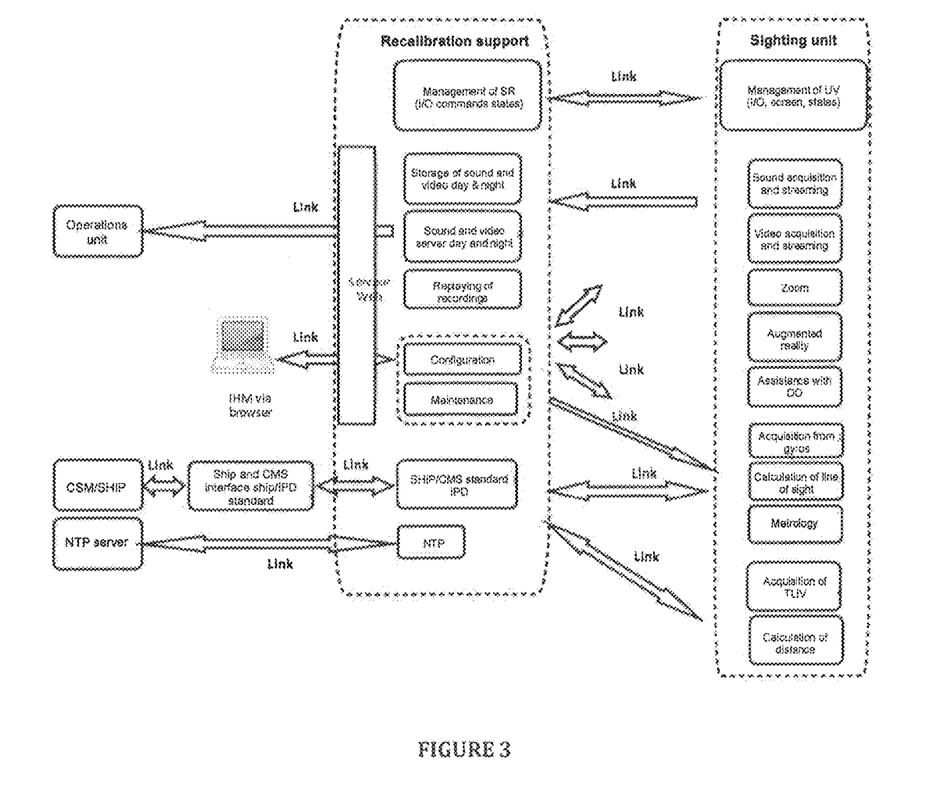
FIG. 3 is a block diagram of the software means used in an embodiment of the device of the invention.

The objective-designation mode using the pointing device of the invention will now be described in detail and as a complement to FIGS. 2 and 3.

Calculation of the Attitude of the Pointer from MEMSs and/or FOGs

The continuous real-time calculation of the attitude of the pointing appliance can rely on the data issuing from an FOG or MEMS trihedron, as it the case on QPD devices.

However, the performance of some MEMS technology sensors comprising a geometric trihedron and accelerometers allows the use of these sensors in the pointing device of the invention although hampered by a greater drift over time than FOGs. Such a mixed use based on an MEMS technology comprising three gyrometers and three accelerometers coupled to a fibre-optic gyrometer offers the advantage of limiting the high drift of MEMS gyrometers with accelerometers in roll/pitch and with the FOG in heading.

Display of Video Images on the Screen of the Pointing Appliance

The device of the invention offers the possibility for the operator to view three types of video on the so-called "sunlight-readable" screen E in real time, the operator being able to switch from one to the other intuitively with a zoom capability. This functionality is added to direct vision through the sighting member D projecting a reticle to infinity. Depending on the operational requirement, the video acquired by a conventional daytime camera or a high-sensitivity camera covering from the visible to the near IR range (400/1100 nm), colour or monochrome, is displayed on the screen E and viewed by the operator. Still according to operational requirements, the video acquired by a non-cooled IR camera (8/12 microns) or a light-intensification camera is presented to the operator.

Another viewing mode is based on the merging of images. The objective of this mode is to use the complementarity of the information obtained in various spectral bands (colour visible and infrared for example) in order to offer to the operator enhanced information and thus to improve his possibilities of detecting and identifying the target.

Detection and Tracking of a Target in the Image

The analysis capability of computers and developments in image-processing algorithms allow real-time calculations greatly improving operational functionalities. The device of the invention therefore fully uses these technologies in order to integrate detection and tracking algorithms applied to the maritime field. In the specific case of images taken in the maritime field, the presence of specular reflection, waves, foam or the wake of ships does not allow a satisfactory modelling of the background, including by statistical models as is conventionally the case. This problem requires the use of specific algorithms suited respectively to the detection of close-by ships and distant ships.

Augmented Reality

The inlaying of tactical data on the image seen by the operator makes it possible to guide him. For example, the information extracted from the geometric trihedron and directly presented on the images displayed on the screen E of the pointing appliance 1 and on the distant station of an operational centre will provide an aid to an understanding of the tactical situation, for the operators.

Among the parameters that can be displayed, the following can be mentioned; an adjustable reticle at the centre of the image, the elevation angle and the azimuth of the centre of the image, the blocked-out surface objects detected, the environment information (names of ships in the vicinity, when the latter are known by the reception of an AIS message for example, etc) or any information assisting the objective designation coming for example from an operations centre or a remote sensor. The information is displayed on the screen E of the pointing appliance 1 without causing any interference on the current action relating to the use of the device.

Stabilisation of the Sighting

Stabilisation of the sighting relies firstly on the application of a conventional filter for stabilising the image and data issuing from the gyrometric trihedron in order to eliminate operator shake in real time and secondly on the tracking of the target designated by the operator in the image.

In the latter case, the operator places the target at the centre of the image at the reticle and validates, by pressing on the trigger for example, in order to designate the target; the tracking of the target in the image then offers better stability of the sighting compared with an operator attempting to hold the target at the centre of the reticle.

Direct Transmission of Photographs

The video images seen on the screen E by the operator, his comments and the ambient noise are transmitted direct to an operations centre or to a remote station. The sound sequences are captured by a microphone directly integrated in the pointing appliance. The device is also designed to record the video images and sound tracks and to enable them to be read and/or exported for analysis purposes.

Distance Information

The information on the distance of the objective, associated with the sighting line obtained by the use of the gyrometric data, makes it possible to change from a 2D designation to a 3D location of the target.

The obtaining of the distance can be achieved by adding a laser rangefinder to the pointing appliance, associated with a filter, the objective of which is to reject aberrant values, to mitigate for the punctiform absence of a measurement and to synchronise on the computation of the line of sight.

An alternative for the measurement of the distance information, which may be complementary to the above solution, consists of estimating the distance of a surface target from a distance tracking algorithm using the previous and successive objective designations made with the same device and the altitude of the pointing appliance with respect to sea level.

Slaying of the Action Means

The slaving of the action means and means for neutralisation of the objective (a firing turret for example) is done using the angular and distance data of the sighting by means of a real-time algorithm making it possible to achieve firstly the required precision and secondly the safety level.

In the context of the control of an artillery piece, the device integrates principal ballistic/future aim computations relying in particular on firing tables of the weapon and of secondary ballistics that uses the actual speed of the wind minus the relative wind created by the movement of the firer. Corrections can also be made by considering the driving speed of the gun due to the translation and rotation movements of the ship around the equilibrium point.

Automatic Recalibration of the Device Outside its Support and Recalibration Box

Another possibility of automatic recalibration of the pointing appliance consists of comparing the data supplied by the navigation unit of the ship with those measured by the gyrometric trihedron G when the pointing appliance 1 is kept immobile with respect to the ship and the trihedron measures only its attitude movements.

Computation of the Biases of the Support and Recalibration Box with Respect to the Reference Frame of the Ship The mechanical recalibration support must be aligned with respect to the reference frame of the ship in order to determine its biases in terms of heading, roll and pitch. This process generally takes place during the phases of installation of the device and requires the use of a previously aligned reference sensor or the use of a theodolite for determining the reference points in the environment. One improvement method consists of automatically calculating the position of the support and recalibration box when the ship is under way, by analysis of the navigation unit and comparison with the gyrometric data of the pointing appliance 1 enclosed and fixed in the box 2.

If however the ship does not have a navigation unit, it is possible to equip it with the equivalent of such a measuring unit with one, or better two, remote modules (in order to have the direction). These measuring boxes contain sensors of the GPS, MEMS, magnetometer or accelerometer type.

Recalibration of the Gyrometric Unit by Means of a Stereo Vision System

The detection and following of particular points in two images coming from two separate cameras, the relative positioning of which and the intrinsic parameters (zoom level, sensor size) of which are known, make it possible to estimate the distance thereof. It then becomes possible, by following these remarkable points over time, to reconstitute the movement of the support of the cameras and therefore to recalibrate the geometric unit G of the system in real time. The approach envisaged therefore consists of positioning, on the pointing appliance 1, a pair of cameras that supply information that can be used by means of vision techniques for determining the movement.

A second option consists of recalibrating the path on itself at the overlap points of the path (or meeting points). This strategy is in particular used in the problem of construction of a mosaic of images. A similar approach makes it possible to completely eliminate drift when the pointing appliance 1 is immobile. In this case, in fact, it is possible to directly calculate the relative positioning between very distant instants and to thereby eliminate cumulative errors resulting from integration.

Collaboration Between the Information Captured by the Pointing Appliance and the Information Issued by the Control Station and/or the Command System The central command station holds the tracks of the various mobile elements detected (terrestrial, air, surface or submarine) as well as the mapping. These tracks may be merged with those of the pointing appliance and make it possible firstly to recalibrate the drift of the inertial sensors (gyrometric unit or accelerometer) taking as a reference the coordinates given by the command system, and secondly make it possible to increase the relative information between the objectives detected by the command system and those solely detected by the pointing appliance.

For the particular case of terrestrial targets, the mapping with its remarkable points makes it possible to position better, without any drift, the objective designated by the point appliance.

In the particular case of threats in an urban environment, the silhouetting of buildings obtained by the image acquisition makes it possible to indicate with precision the location of the threat (sniper, etc).

Recalibration by Means of the Stars or Noteworthy Geographical Points

Knowledge of the exact position of the pointing appliance relative to the stars or to noteworthy geographical points and to the image acquisition makes it possible to recalibrate the inertial sensors.

The invention claimed is:

1. A device for the designation of objectives, comprising a direct sighting member, associated with a gyroscopic unit providing a gyrometric trihedron with three axes not parallel to each other and coupled firstly to
   means for analysing the signals issuing from the sighting member, said means being able to determine the direction between the sighting member and said objectives and to transmit it to a distant control station provided with action means, and
   secondly to means for recalibrating the gyroscopic unit, wherein it further comprises image-acquisition means providing photography of the objectives, said acquisition means being associated with the direct-sighting member and coupled to software means for processing the images and to means for displaying said images,
   wherein said gyroscopic unit comprises micro-electro-mechanical systems (MEMS) sensors combining said gyrometric trihedron and accelerometers.

2. The device according to claim 1, wherein it comprises a portable pointing appliance comprising at least one manoeuvring grip provided with a control member connected to at least one tubular element receiving said acquisition means and said image display means and carrying a member for the removable fixing of the direct sighting member.

3. The device according to claim 2, wherein said pointing appliance comprises two substantially parallel manoeuvring grips, inclined upwards and forwards while being connected to two tubular members, respectively top (1a) and bottom (1b), with parallel longitudinal axes.

4. The device according to claim 2, wherein that said recalibration means comprise a box for the support and mechanical recalibration of the pointing appliance provided with means for the removable holding of said appliance, an internal computer, an electronic contact interface providing communication of the appliance with the control station, and electrical supply means.

5. The device according to claim 4, wherein in that said holding means comprise a set of longitudinal grooves carried by the flanks of the pointing appliance and intended to cooperate by sliding with a set of pins, at least partially metallic, carried by the internal walls of the housing and providing the electronic contact interface with said pointing appliance.

6. The device according to claim 2, wherein in that said pointing appliance is provided with a tie bar.

7. The device according to claim 2, wherein said handle of the pointing appliance is inclined relative to the axis of the tubular element.

8. The device according to claim 2, wherein in that said pointing appliance comprises two control members consisting respectively of a trigger and a handle.

9. The device according to claim 1, wherein in that said recalibration means are integrated in the image-processing means.

10. The device according to claim 1, wherein said image-acquisition means comprise at least one video camera.

11. The device according to claim 10, wherein said image-acquisition means comprise at least two video cameras including a night-vision camera.

12. The device according to claim 10, wherein at least one of said cameras is equipped with a zoom and an image-stabilisation filter.

13. The device according to claim 1, wherein in that said image-acquisition means (A) are associated with means for recording said images with their location and dating.

14. The device according to claim 1, wherein said image-display means comprise a video screen mounted in the vicinity of the sighting member.

15. The device according to claim 1, wherein said display means receive information coming both from the image-acquisition means and from the distant control station.

16. The device according to claim 1, wherein it further comprises a microphone and a loudspeaker.

17. The device according to claim 1, wherein the sighting member is associated with a laser rangefinder for measuring the distance to the objectives.

18. The device according to claim 1, wherein said image-acquisition means allow the merger of images on the display means.

19. An objective-designation method, wherein the target is pointed to using the device according to claim 1.

* * * * *